A. L. BERRY.
COLLAPSIBLE LUGGAGE HOLDER.
APPLICATION FILED AUG. 6, 1920.

1,378,210.

Patented May 17, 1921.
2 SHEETS—SHEET 1.

Inventor
Alfred L. Berry,
By Hiram A. Sturges
Attorney

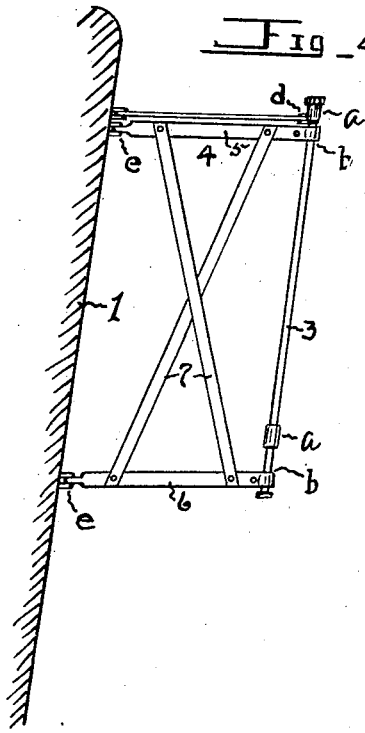
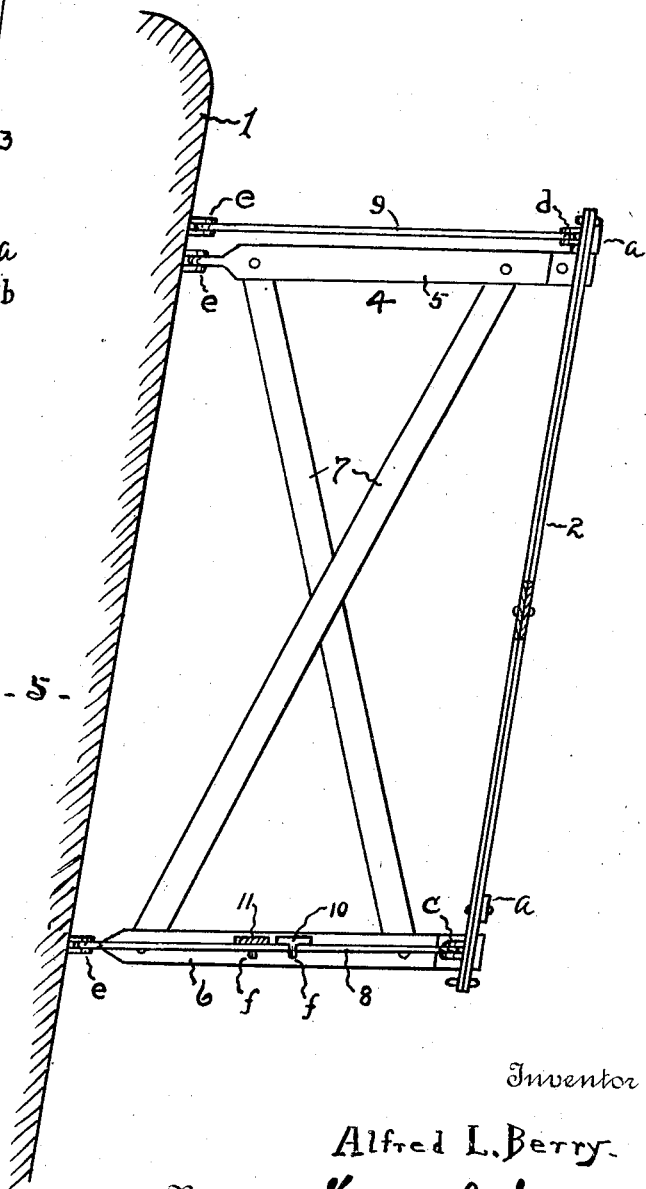

UNITED STATES PATENT OFFICE.

ALFRED L. BERRY, OF LINCOLN, NEBRASKA.

COLLAPSIBLE LUGGAGE-HOLDER.

1,378,210.

Specification of Letters Patent.  Patented May 17, 1921.

Application filed August 6, 1920. Serial No. 401,788.

*To all whom it may concern:*

Be it known that I, ALFRED L. BERRY, a citizen of the United States, residing at Lincoln, in the county of Lancaster and State of Nebraska, have invented certain new and useful Improvements in a Collapsible Luggage-Holder, of which the following is a specification.

This invention relates to a luggage holder particularly adapted for use in connection with automobiles, and has for its object to provide a rack or holder which may be mounted upon the back of the driver's seat of an automobile for containing satchels or other luggage, and may be readily removed therefrom, and may be collapsed to occupy a very limited space, said holder to consist of few and simple parts so that it will be durable and may be manufactured economically.

The invention consists of the novel construction, combination and arrangement of parts as described herein and claimed, and as illustrated in the accompanying drawing, wherein,—

Figure 1:
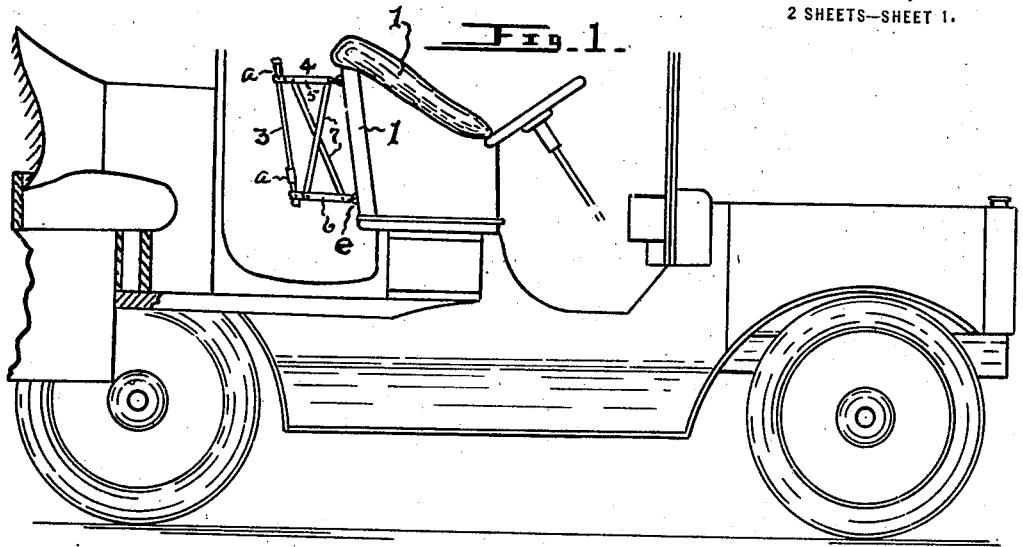
Figure 2:
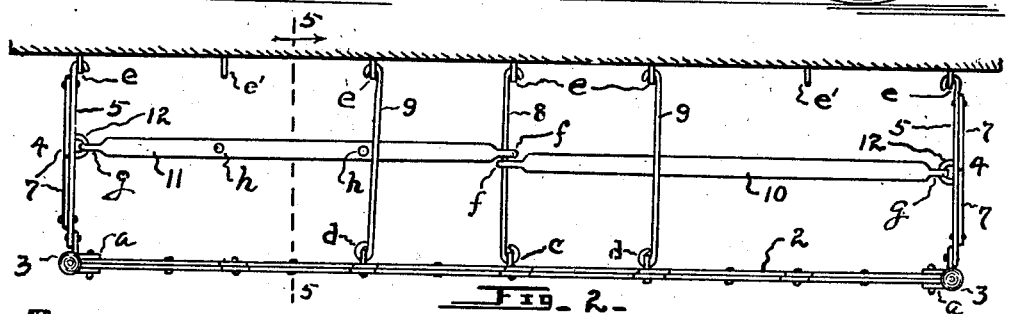
Figure 3:
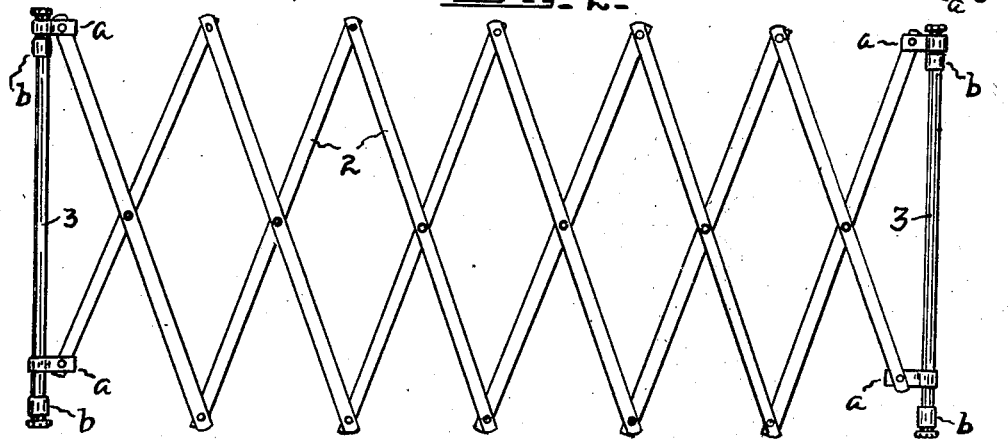

Figure 1 is a broken away view showing the device applied to an automobile. Fig. 2 is a plan view of a collapsible luggage holder. Fig. 3 is a rear view and Fig. 4 is an end view of the same. Fig. 5 is a transverse section through the holder, on line 5—5 of Fig. 2.

Referring now to the drawing for a more particular description, the invention is illustrated in connection with a driver's seat 1 of an automobile, and in order that suit cases, satchels and other like articles may be carried in a manner to be unobtrusive, I provide a holder adapted to be removably attached to the back of the seat, said holder to be so constructed that it may be folded or collapsed, when not in use, so that it may be carried as a part of the equipment of the vehicle.

The device consists of the lazy-tongs 2, provided at its ends with a pair of pivot-posts 3, its connection with said posts being near the ends of the latter by means of staples or clips *a* which may have a limited rotation upon said posts 3. Numerals 4 indicate end-sections, each consisting of a pair of hook-arms, indicated respectively at 5 and 6, each having a pivotal connection indicated at *b* upon and adjacent to the ends of a post 3, a pair of cross-strips 7 being provided for each end-section, their ends being secured to the hook-arms to maintain said arms in spaced relation and preventing swinging movements of the arms of a section from or toward each other.

Numerals 8 and 9 indicate spacing-hooks, the hook 8 being pivotally connected with the lower part, midway between the ends, of the lazy-tongs, as indicated at *c*, and the hooks 9 being pivotally connected, as indicated at *d* with the upper part of the lazy-tongs, and at *e* and *e'* are indicated screw-eyes which are provided for the support and for receiving the hooks of members 5, 6, 8 and 9. Numerals 10 and 11 indicate a pair of adjusting-strips, each being provided at one of its ends with a hook *f* for engaging the member 8, as best shown in Fig. 2, its opposite end being pivotally connected as indicated at *g*, with a staple 12 which is provided for a hook-arm 6, said strips 10 and 11 being of use in making certain adjustments, and providing a support for articles which may be placed within the holder, said strips being disposed upon and supported by the spacing-hook 8.

In some instances a comparatively long holder is desirable, as shown in Fig. 2. The device, however, may be collapsed to provide a holder of lesser length, the lazy-tongs being partly collapsed to permit the hook-arms to engage in the screw-eyes *e'*, the hook *f* of the adjusting-strip 10 engaging in one of the apertures *h* of the adjusting-strip 11.

The device, when removed from the support, may be collapsed or folded to occupy a very limited space, to accomplish this, the lazy-tongs may be collapsed, and after the adjusting-strips have swung into engagement with the inner sides of the end-sections, the latter may be swung into engagement with the lazy-tongs.

The device as described, will be appreciated by users of motor vehicles generally, since the holder, whenever desired, may be attached to the back of the driver's seat 1, to be disposed above the floor of the vehicle, or may be conveniently removed therefrom.

While one or both of the spacing-hooks 9 could be dispensed with, one at least should be used, since it operates to resist any outward pressure occasioned by the contents of the holder, the lazy-tongs preferably being constructed of comparatively thin strips. The spacing-hook 8, however, or an equivalent member, is considered to be necessary, since it supports the adjusting-strips for the lower part of the holder.

While I have described construction in detail, I do not wish to be understood as limiting myself in this respect, and form, size, proportion and minor details may be changed, as found to be of advantage, said changes to be determined by the scope of the invention as claimed.

What I claim as new and desire to secure by Letters Patent is,—

1. In a collapsible luggage-holder for a support, a lazy-tongs, a pair of pivot-posts each being movably connected adjacent to its ends with one of the ends of the lazy-tongs, a pair of end-sections, each including a pair of hook-arms for a removable connection with the support, said hook-arms being movably mounted upon and near the respective ends of said pivot-posts, spacing-strips engaging and tending to prevent swinging movements of the arms of a section from or toward each other, spacing-hooks pivotally mounted upon the lazy-tongs near the top and bottom thereof for a removable connection with the support, and a pair of adjusting-strips, each being provided with a terminal hook and having a pivotal connection with a hook-arm of a section for engaging one of said spacing-hooks.

2. In a collapsible luggage holder for a support having fastening devices, a lazy-tongs, a pair of end-sections connected with the respective ends of the lazy-tongs to permit swinging movements therefrom and provided with hooks for engaging the fastening devices of the support, spacing-hooks pivotally mounted on the lazy-tongs and adapted to engage the fastening devices of the support, an apertured adjusting-strip pivotally connected with an end-section and adapted to engage one of the spacing-hooks, and a second adjusting-strip pivotally connected with the other end-section and provided with a hook for engaging in an aperture of the first named adjusting-strip.

In testimony whereof, I have affixed my signature in presence of two witnesses.

ALFRED L. BERRY.

Witnesses:
HIRAM A. STURGES,
BENJ. T. LOHNES.